United States Patent
Kamiya (10) Patent No.: US 9,392,096 B2
(45) Date of Patent: Jul. 12, 2016

(54) COMMUNICATION SYSTEM, COMMUNICATION METHOD, AND CONTROLLER

(71) Applicant: Masachika Kamiya, Toyota (JP)

(72) Inventor: Masachika Kamiya, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/404,357

(22) PCT Filed: Jun. 7, 2013

(86) PCT No.: PCT/IB2013/001189
§ 371 (c)(1),
(2) Date: Nov. 26, 2014

(87) PCT Pub. No.: WO2013/186615
PCT Pub. Date: Dec. 19, 2013

(65) Prior Publication Data
US 2015/0140995 A1 May 21, 2015

(30) Foreign Application Priority Data
Jun. 12, 2012 (JP) .................. 2012-133243

(51) Int. Cl.
H04M 1/725 (2006.01)
B60R 16/02 (2006.01)
B60R 25/24 (2013.01)
H04L 29/08 (2006.01)

(52) U.S. Cl.
CPC .......... *H04M 1/72527* (2013.01); *B60R 16/02* (2013.01); *B60R 25/24* (2013.01); *H04L 67/12* (2013.01)

(58) Field of Classification Search
CPC ....................................... H04B 15/00
USPC ............................ 455/420; 701/36; 715/970
See application file for complete search history.

(56) References Cited

U.S. PATENT DOCUMENTS

| 6,275,231 | B1 * | 8/2001 | Obradovich | B60R 16/0231 345/156 |
| 8,527,140 | B2 * | 9/2013 | Schwartz | B60R 25/00 340/539.13 |
| 2006/0089185 | A1 * | 4/2006 | Han | B60R 25/102 455/575.9 |
| 2007/0019825 | A1 * | 1/2007 | Marumoto | H04R 5/02 381/94.1 |

(Continued)

FOREIGN PATENT DOCUMENTS

| JP | 2006-104663 A | 4/2006 |
| JP | 2010-018225 A | 1/2010 |
| JP | 2012-062044 A | 3/2012 |

*Primary Examiner* — Vladimir Magloire
*Assistant Examiner* — Majid Syed
(74) *Attorney, Agent, or Firm* — Sughrue Mion, PLLC (57) ABSTRACT

A communication system includes checking means for performing a check to detect whether a mobile device carried by a user of a vehicle is in the vehicle via wireless communication between an onboard device and the mobile device when a door of the vehicle has changed from being open to being closed; detecting means for detecting an operating state of an onboard electrical load when the check is performed by the checking means; and changing means for changing a maximum value of a number of rechecks, which is the number of times the check is allowed to be repeatedly performed by the checking means, according to the operating state of the onboard electrical load detected by the detecting means, when it has not been detected that the mobile device is in the vehicle by the check performed by the checking means.

7 Claims, 3 Drawing Sheets (56) References Cited

U.S. PATENT DOCUMENTS

2014/0028477 A1\* 1/2014 Michalske ............ G08G 1/005
 340/990

2014/0323039 A1\* 10/2014 Hong ...................... H04B 7/24
 455/39

\* cited by examiner

|  | ENGINE | D/WIPER ||
| --- | --- | --- | --- |
|  |  | CONTINUOUS | INTERMITTENT |
| MAXIMUM VALUE (n) OF NUMBER OF RECHECKS | LARGE | MEDIUM | SMALL |

COMMUNICATION SYSTEM, COMMUNICATION METHOD, AND CONTROLLER

BACKGROUND OF THE INVENTION

1. Field of the Invention

The invention relates to a communication system, a communication method, and a controller. More particularly, the invention relates to a communication system, a communication method, and a controller that check whether a mobile device carried by a user of a vehicle is in a vehicle cabin (hereinafter also simply referred to as "in the vehicle") via wireless communication between an onboard device and the mobile device, when a door of the vehicle has changed from being open to being closed while the power is on.

2. Description of Related Art

A vehicle control system that allows an engine to start or locks/unlocks a vehicle door via wireless communication between an onboard device and a mobile device carried by a user of a vehicle is known (see Japanese Patent Application Publication No. 2006-104663 (JP 2006-104663 A), for example). In this vehicle control system, in order to prevent the mobile device from being taken out of the vehicle, a vehicle interior check to check whether the mobile device is in the vehicle is performed via wireless communication between the onboard device and the mobile device when a vehicle door is opened or closed.

The vehicle interior check via wireless communication between the onboard device and the mobile device may be impeded by electromagnetic noise generated by a power harness or onboard electrical equipment. If this happens, the vehicle interior check will not be able to be performed properly, and as a result, it may be erroneously determined that the mobile device is not in the vehicle when in fact the mobile device is actually in the vehicle, and an alarm may consequently be issued.

Therefore, in order to avoid this happening, in the vehicle control system described above, when electromagnetic noise of a predetermined level or higher is detected, an alarm is issued to notify a vehicle occupant that this noise has been detected.

However, with the vehicle control system according to JP 2006-104663 A described above, only an alarm is issued when noise from onboard electrical equipment or the like is detected, so wireless communication between the onboard device and the mobile device (i.e., the vehicle interior check) may continue to be impeded by this noise. Therefore, it is difficult to properly perform a vehicle interior check when a vehicle door is opened or closed.

Here, in order to eliminate the effect of noise and detect that the mobile device is in the vehicle cabin by the vehicle interior check, if there is a discrepancy in the vehicle interior check via wireless communication between the onboard device and the mobile device, it is conceivable to perform the check again in a similar manner via wireless communication between the onboard device and the mobile device (hereinafter, this will simply be referred to as a "recheck").

However, after there has been a discrepancy in the vehicle interior check via wireless communication between the onboard device and the mobile device, the timing of an alarm based on this discrepancy in the check will be increasingly delayed the greater the maximum number of times that a recheck is allowed (i.e., the greater the maximum value of the number of rechecks) is. That is, if the number of rechecks is too large, the alarm to notify a user of the vehicle that the mobile device has been taken out of the vehicle will not be able to be issued quickly. On the other hand, by lowering the maximum value of the number of rechecks, a delay in the alarm timing based on the vehicle interior check discrepancy is able to be reduced, so an alarm indicating that the mobile device has been taken out of the vehicle is able to be issued quickly. However, even if noise is not generated frequently, there are fewer times (i.e., opportunities) when the check will not be affected by this noise when the check is performed, so it is possible that the result of the vehicle interior check may not be positive (check OK) even once, even if the mobile device is in the vehicle cabin. That is, if the number of rechecks is too few, the likelihood of an alarm indicating that the mobile device has been taken out of the vehicle being erroneously issued increases.

The noise may be noise from ignition of an engine or noise from a motor of a vehicle wiper or the like. The way in which the noise is generated, and the level of the noise, differ depending on the noise generating source. Therefore, if the number of rechecks is uniformly set, then depending on the noise generating source, there may end up being a delay in the alarm timing based on a vehicle interior check discrepancy, or an alarm indicating that the mobile device has been taken out of the vehicle may end up being erroneously issued.

SUMMARY OF THE INVENTION

The invention thus provides a communication system, a communication method, and a controller capable of inhibiting, to the greatest extent possible, an alarm indicating that a mobile device has been taken out of a vehicle from being erroneously issued, while shortening a delay in the alarm timing based on a vehicle interior check discrepancy, even when noise is being generated.

A first aspect of the invention relates to a communication system that includes checking means for performing a check to detect whether a mobile device carried by a user of a vehicle is in the vehicle via wireless communication between an onboard device and the mobile device when a door of the vehicle has changed from being open to being closed; detecting means for detecting an operating state of an onboard electrical load when the check is performed by the checking means; and changing means for changing a maximum value of a number of rechecks, which is the number of times the check is allowed to be repeatedly performed by the checking means, according to the operating state of the onboard electrical load detected by the detecting means, when it has not been detected that the mobile device is in the vehicle by the check performed by the checking means.

A second aspect of the invention relates to a communication method that includes performing a check to detect whether a mobile device carried by a user of a vehicle is in the vehicle via wireless communication between an onboard device and the mobile device when a door of the vehicle has changed from being open to being closed; detecting an operating state of an onboard electrical load when the check is performed; and changing a maximum value of a number of rechecks, which is the number of times the check is allowed to be repeatedly performed, according to the operating state of the onboard electrical load, when it has not been detected that the mobile device is in the vehicle by the check.

A third aspect of the invention relates to a controller that includes a checking portion that performs a check to detect whether a mobile device carried by a user of a vehicle is in the vehicle via wireless communication between an onboard device and the mobile device when a door of the vehicle has changed from being open to being closed; a detecting portion that detects an operating state of an onboard electrical load when the check is performed by the checking portion; and a changing portion that changes a maximum value of a number of rechecks, which is the number of times the check is allowed to be repeatedly performed by the checking portion, according to the operating state of the onboard electrical load detected by the detecting portion, when it has not been detected that the mobile device is in the vehicle by the check performed by the checking portion.

According to these aspects, it is possible to inhibit, to the greatest extent possible, an alarm indicating that a mobile device has been taken out of a vehicle from being erroneously issued, while shortening a delay in the alarm timing based on a vehicle interior check discrepancy, even when noise is being generated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, specific example embodiments of the communication system according to the invention will be described with reference to the accompanying drawings.

Figure 1:
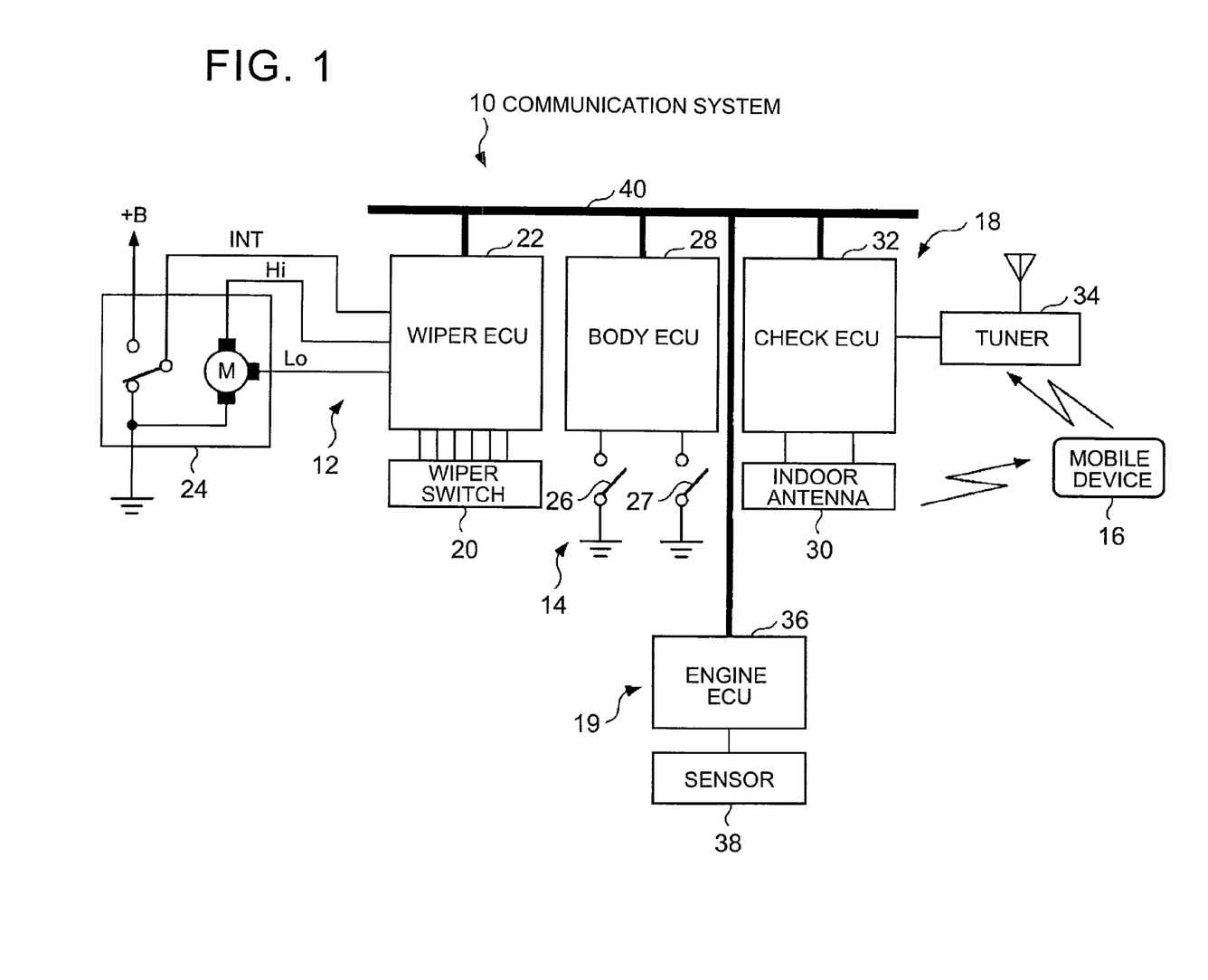
FIG. 1 is a block diagram of a communication system according to an example embodiment of the invention.

FIG. 1 is a block diagram of a communication system 10 according to one example embodiment of the invention. The communication system 10 of this example embodiment is a control system that is mounted in a vehicle, and has the structure described below. That is, the communication system 10 includes a wiper control device 12 that controls the operation of a wiper that wipes an outside surface of a front windshield or a rear window, a body control device 14 that detects both the opening and closing of a vehicle door, a checking device 18 that wirelessly communicates with a mobile device 16, and an engine control unit 19 that controls the operation of a vehicle engine as shown in FIG. 1.

The wiper control device 12 has a wiper control switch 20 that can be operated by a driver of the vehicle, a wiper electronic control unit (hereinafter, simply referred to as "wiper ECU") 22 that performs an operating process of the wiper, and a wiper motor 24 that operates the wiper. The wiper control device 12 may be a rain sensing type that is able to control wiper operation automatically according to the amount of rain and the vehicle speed, or it may be an intermittent time-adjust type in which the frequency of the intermittent operation of the wiper is able to be controlled by the driver.

The wiper control switch 20 is an operating switch for switching the wiper among various states, i.e., an OFF state in which operation of the wiper is stopped, an AUTO state in which the wiper is operated automatically or an INT state in which the wiper is operated intermittently, a LO state in which the wiper is operated continuously at a low speed, and a HI state in which the wiper is operated continuously at a high speed. The wiper ECU 22 is connected to this wiper control switch 20. Wiper operation command information indicated by the wiper control switch 20 is supplied to the wiper ECU 22.

The wiper ECU 22 mainly includes a CPU that performs an operating process, RAM that provides a work area for the CPU, and ROM in which programs and data are stored. The wiper ECU 22 specifies the operating state to be realized by the wiper that is required by the driver of the vehicle, based on the operation command information from the wiper control switch 20. The wiper ECU 22 may also drive the wiper also using information from a rain sensor and information related to the vehicle speed. More specifically, the wiper ECU 22 may specify the optimum operating state to be realized by the wiper, from an intermittent operating state of intermittent pauses of a predetermined length of time (e.g., 15 seconds at most) to the high speed continuous operating state, based on the amount of rain detected using the rain sensor and the vehicle speed detected using a vehicle speed sensor, when the wiper control switch 20 is in the position corresponding to the AUTO state. This optimum operating state may be set, for example, to an intermittent operating state in which the intermittent pause time is longer when the amount of rain is smaller or the vehicle speed is lower, or it may be set to a continuous operating state of a higher speed when the amount of rain is greater or the vehicle speed is higher.

The wiper motor 24 is connected to the wiper ECU 22. In principle, when the operating state to be realized by the wiper is specified as described above, the wiper ECU 22 outputs a drive command to the wiper motor 24 so that the operating state of the wiper matches the specified operating state. The wiper motor 24 is an electric motor for operating a front wiper that wipes the outside surface of a front windshield, or a rear wiper that wipes the outside surface of a rear window, either of which may serve as the wiper. The wiper motor 24 operates the wiper according to the drive command from the wiper ECU 22.

Also, the body control device 14 includes a courtesy switch 26 that turns on or off according to the state of a door of the vehicle, i.e., whether a door of the vehicle is open or closed, a power switch 27 that can be operated by the driver of the vehicle, and a body electronic control unit (hereinafter, simply referred to as "body ECU") 28 that detects the state (i.e., an open state and a closed state) of a door of the vehicle. The courtesy switch 26 is a switch that turns off when a door of the vehicle is open (e.g., particularly a front door next to the driver seat or the front passenger seat), and turns on when the vehicle door is closed. Also, the power switch 27 is a push-type switch for switching a power supply state to onboard equipment among off (OFF), accessories-on (ACC ON), ignition-on (IG ON), and, when the vehicle is a hybrid vehicle, hybrid system startup. Information relating to the state of a door of the vehicle (i.e., an open state or a closed state) indicated by the courtesy switch 26, and ON/OFF information of the power switch 27 are both supplied to the body ECU 28.

The body ECU 28 mainly includes a CPU that performs an operating process, RAM that provides a work area for the CPU, and ROM in which programs and data are stored. The body ECU 28 detects the open state and the closed state of the door of the vehicle described above based on the information relating to the open state or the closed state of the door from the courtesy switch 26. Also, the body ECU 28 determines whether the power switch 27 has been pushed in based on the ON/OFF information from the power switch 27. Also, when it is determined that the power switch 27 has been pushed in, the power supply state to the onboard equipment is switched among off, accessories-on, and ignition-on, based on a shift position and whether there is a brake pedal operation. When the vehicle is a hybrid electric vehicle, the power supply state would be switched to hybrid system startup instead of ignition-on.

Furthermore, the mobile device 16 is a mobile key that is carried by a user of the vehicle. This key is an electronic key used with a corresponding vehicle. The mobile device 16 has a communication function for wirelessly communicating with the checking device 18, and is able to send and receive signals of a predetermined frequency (such as in a LF band, e.g., a 125 kHz band or a 134 kHz band, or in a RF band, e.g., a 300 MHz band or a 400 MHz band) to and from the checking device 18. Various devices mounted in the vehicle each display a function based on the check results from the wireless communication between the mobile device 16 and the checking device 18. For example, the devices may display a function for unlocking a vehicle door, a function for locking a vehicle door, a function for changing a power supplying state to onboard equipment according to a combination, of an ignition switch operation and a brake pedal operation, and a function for determining whether the mobile device 16 has been taken out of the vehicle, and the like.

The checking device 18 has an indoor antenna 30 provided in the vehicle cabin, a check electronic control unit (hereinafter, simply referred to as a "check ECU") 32 that checks a code obtained via wireless communication with the mobile device 16, and an indoor tuner 34 that receives signals from the mobile device 16. The check ECU 32 generates a request signal to request a response from the mobile device 16, and sends this request signal from a suitable transmitting antenna. When the state of the door of the vehicle changes from an open state to a closed state, the check ECU 32 sends a request signal from the indoor antenna 30 and creates a detection area for detecting the mobile device 16 in the vehicle cabin in order to realize the vehicle interior check function to determine whether the mobile device 16 is in the vehicle, i.e., whether the mobile device 16 has been taken out of the vehicle.

The mobile device 16 is able to receive the request signal sent from the checking device 18 that is an onboard device. Upon receiving the request signal from the checking device 18, the mobile device 16 sends a response signal in response to this request signal. The checking device 18 is able to receive the response signal sent from the mobile device 16. The response signal from the mobile device 16 that is received by the checking device 18 is supplied to the check ECU 32.

After a request signal has been transmitted from a transmitting antenna, when the check ECU 32 receives the response signal in response to this request signal transmitted from the mobile device 16, the check ECU 32 then checks an ID code obtained by demodulating this response signal against a predetermined ID code stored in the memory of the check ECU 32 itself beforehand. The check ECU 32 then drives the onboard device corresponding to the displayed function based on this check result.

The checking device 18 is able to receive the response signal from the mobile device 16 using the indoor tuner 34 provided in the vehicle cabin. The check ECU 32 is connected to the indoor tuner 34. The response signal from the mobile device 16 that is received by the indoor tuner 34 is supplied to the check ECU 32. After a request signal has been sent from the indoor antenna 30, the check ECU 32 determines whether a response signal sent from the mobile device 16 in response to this request signal has been received by the indoor tuner 34. If it is determined that this response signal has been received by the indoor tuner 34, the check ECU 32 checks an ID code obtained by demodulating this response signal with a predetermined ID code stored in memory beforehand.

As a result, if it is determined that the response signal has not been received by the indoor tuner 34, or if it is determined that the response signal has been received by the indoor tuner 34 but the ID code does not match, then it is determined that the authorized mobile device 16 is not in the vehicle cabin, and an alarm is issued by sounding a buzzer or the like, for example. On the other hand, if the response signal is received by the indoor tuner 34 and the ID code matches, it is determined that the authorized mobile device 16 is in the vehicle cabin, so an alarm is not issued.

The engine control unit 19 includes an engine electronic control unit (hereinafter, referred to as "engine ECU") 36 that performs an operation process of the engine, and a sensor 38 that detects information necessary to control the engine. The sensor 38 is, for example, an accelerator position sensor, a throttle position sensor, and O2 sensor, a water temperature sensor, or an engine speed sensor, or the like. The sensor 38 sends a signal indicative of the detected information to the engine ECU 36. The engine ECU 36 calculates a fuel injection quantity to be supplied to the engine, a fuel injection time, and an ignition timing of the engine, and the like, based on the signal from the sensor 38. The engine ECU 36 controls the engine based on these calculation results.

The wiper ECU 22, the body ECU 28, the check ECU 32, and the engine ECU 36 are all connected together via an onboard LAN 40. ECUs other than those described above may also be connected to the onboard LAN 40. The onboard LAN 40 may be a CAN (Controller Area Network) or the like, for example. The ECUs that are connected together via the onboard LAN 40 are able to send and receive data to and from each other via the onboard LAN 40.

Hereinafter, the characteristic operation of the communication system 10 will be described with reference to FIGS. 2 and 3.

Figure 2:
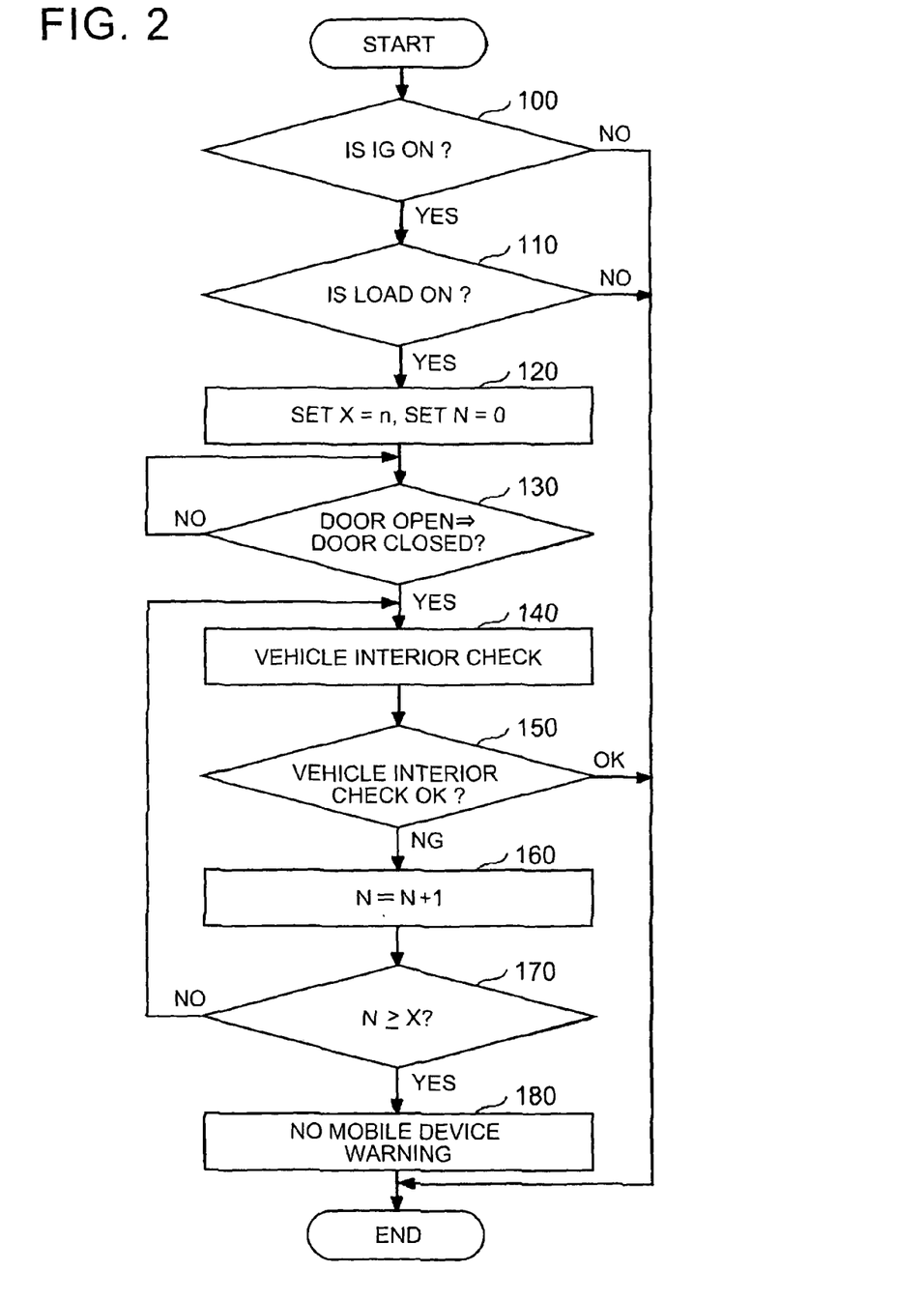
FIG. 2 is a flowchart of one example of a control routine executed in the communication system of the invention.
Figure 3:
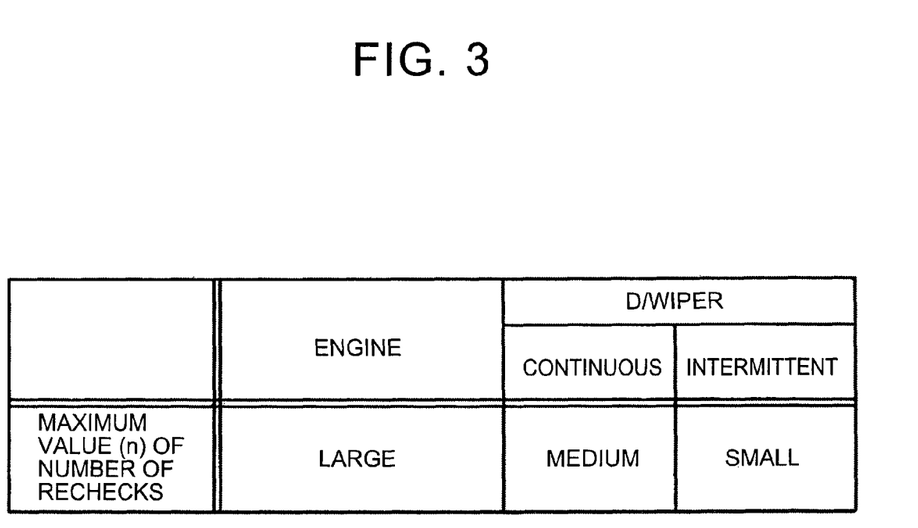
FIG. 3 is an example of a map that establishes the number of rechecks of a check used in the communication system of the invention, according to an onboard electrical load.

FIG. 2 is a flowchart of one example of a control routine executed in the communication system 10 of the invention.

First, the body ECU 28 of the body control device 14 determines whether the power supply state of the vehicle that changes in response to the power switch 27 being turned on, is in the ignition-on state that turns on an ignition relay and allows engine operation (step 100). If it is determined as a result that the vehicle power supply state is not in the ignition-on state, this cycle of the routine ends without proceeding on to any other steps. On the other hand, if it is determined that the vehicle power supply state is in the ignition-on state, the body ECU 28 then determines whether an onboard electrical load such as the engine or electrical components mounted in the vehicle is operating (step 110).

When the power is on, the wiper ECU 22 of the wiper control device 12 specifies an operating state to be realized by the wiper that is required by the driver of the vehicle, based on the operation command information from the wiper control switch 20, and outputs a drive command to the wiper motor 24 such that this specified operating state is realized. The wiper ECU 22 periodically outputs information indicative of the operating state of the wiper to the onboard LAN 40. Also, the engine ECU 36 of the engine control unit 19 controls the fuel injection and ignition of the engine based on the sensor value from the sensor 38, and periodically outputs information indicative of the operating state of the engine to the onboard LAN 40.

The body ECU 28 receives, via the onboard LAN 40, the information indicative of the operating state of the wiper from the wiper ECU 22 and the information indicative of the operating state of the engine from the engine ECU 36, and determines in step 110 whether the wiper motor 24 or the engine is operating. If it is determined as a result that the wiper motor 24 or the engine is not operating, this cycle of the routine ends without proceeding on to any other steps. On the other hand, if it is determined that the wiper motor 24 or the engine is operating, the body ECU 28 performs a process that sets a number of setting times X to a predetermined number of times n, and sets a number of checks N to zero (step 120).

The number of setting times X is the maximum value of the number of times that the vehicle interior check via wireless communication between the checking device 18 and the mobile device 16 may be repeatedly performed (i.e., the maximum number of rechecks) when the ID code does not match, necessary to issue an alarm indicating that the mobile device 16 has been taken out of the vehicle (hereinafter, also referred to simply as "alarm"), after a condition to execute the vehicle interior check is satisfied. Also, the number of vehicle interior checks N is the number of times that the vehicle interior check is actually executed via wireless communication between the checking device 18 and the mobile device 16 after the condition to execute the vehicle interior check is satisfied.

Furthermore, the predetermined number of times n is a value equal to or greater than 1, and differs according to the engine and electrical components that are actually operating in the vehicle. The predetermined number of times n may also be equal to or greater than 2. For example, as shown in FIG. 3, the predetermined number of times n may be set relatively large when the engine, which generates a high level of noise when operating, is operating, and set relatively small when the wiper, which generates a low level of noise when operating, is operating. Also, even when the same wiper is operating, when the operating state of this wiper differs, the predetermined number of times n may be set relatively large when the wiper is operated continuously, and may be set relatively small when the wiper is operated intermittently. Also, even when the same wiper is operating intermittently, when the inoperative time between the timings at which the wiper is operating (i.e., the operating interval or intermittent pause time) differs, the predetermined number of times n is set larger the shorter the inoperative time is, and is set smaller the longer the inoperative time is. Also, when a plurality of onboard electrical loads that generate noise are operating simultaneously, a suitable value may be selected or calculated for the number of setting times X, from the predetermined number of times n that is set for the onboard electrical loads that are operating. For example, the largest value of the predetermined number of times n that are set for the onboard electrical loads that are operating may be employed for the number of setting times X.

Next, after the process in step 120 is executed, the body ECU 28 determines whether a door of the vehicle (e.g., particularly a front door next to the driver seat or the front passenger seat) has changed to a closed state, or more specifically, whether the door has changed from being open to being closed, based on the information relating to the state of the door of the vehicle (i.e., an open state or a closed state) from the courtesy switch 26 (step 130). This determination is made repeatedly until the determination is yes. When the body ECU 28 determines that the door of the vehicle has changed from being open to being closed, the body ECU 28 performs a process to direct the checking device 18 to check the vehicle cabin, or more specifically, performs a process to output an execution command for the vehicle interior check (also referred to as a "vehicle interior check execution command") to the onboard LAN 40 (step 140).

The check ECU 32 of the checking device 18 receives the vehicle interior check execution command from the body ECU 28 via the onboard LAN 40. Upon receiving the vehicle interior check execution command from the body ECU 28, the check ECU 32 sends a request signal from the indoor antenna 30 requesting a response from the mobile device 16 and creates a detection area for detecting the mobile device 16 in the vehicle cabin. Then, the check ECU 32 determines whether a response signal from the mobile device 16 has been received by the indoor tuner 34, and if it is determined that this response signal has been received, the check ECU 32 determines whether an ID code of this response signal matches a predetermined ID code, and outputs these detection results to the onboard LAN 40.

Next, after the body ECU 28 sends the vehicle interior check execution command for the check ECU 32 to the onboard LAN 40, the body ECU 28 determines whether the ID code matches from the check for this execution command, based on the determination results from the check ECU 32 (step 150). If it is determined as a result that the ID code in the check for the execution command matches, this cycle of the routine ends without proceeding on to any other steps.

On the other hand, if the check ECU 32 determines as a result of the vehicle interior check for the execution command that the response signal has not been received by the indoor tuner 34, or that the received ID code does not match the ID code stored in advance, the number of checks N is incremented by 1 (step 160). Next, the body ECU 28 determines whether this number of checks N is equal to or greater than the number of setting times X that has been set to the predetermined number of times n in step 120 (step 170).

If the result of step 170 is such that it is determined that $N \geq X$ is not satisfied, i.e., if it is determined that the number of vehicle interior checks N is less than the number of setting times X, the process returns to step 140, and the checking device 18 is directed to execute the vehicle interior check. On the other hand, if it is determined that $N \geq X$ is satisfied, i.e., if it is determined that the number of vehicle interior checks N has reached the number of setting times X, then it is determined that the authorized mobile device 16 is not in the vehicle cabin. The body ECU 28 then issues an alarm such as a buzzer alarm or a warning indicator or the like to indicate this (step 180).

According to the process described above, when the door of the vehicle has switched from being open to being closed while the power supply state to the onboard equipment is the ignition-on state, the vehicle interior check is able to be executed via wireless communication between the checking device 18 and the mobile device 16, and if the ID code does not match from this check, an alarm is issued such that the mobile device 16 is not taken out of the vehicle.

Also, when the onboard electronic load is in the ignition-on state, the check that is performed when the door of the vehicle has switched from being open to being closed is able to be allowed a plurality of times. That is, when the ID code does not match from one check, the check is then able to be performed again. Therefore, the number of opportunities to perform the check is able to be increased even when the check is performed in a situation in which motor noise or ignition noise is generated due to operation of an onboard electrical load such as an engine or a wiper. That is, the number of times (i.e., opportunities) that the check will not be affected by noise when the check is performed is able to be increased. Therefore, according to this example embodiment, the likelihood of an alarm indicating that the mobile device 16 has been taken out of the vehicle being erroneously issued based on a discrepancy in the vehicle interior check even though the mobile device 16 is in the vehicle cabin is able to be reduced.

Furthermore, the maximum value of the number of times that the check described above is allowed to be repeatedly performed (i.e., the maximum value of the number of rechecks) is able to be changed according to the onboard electrical load that is operating. More specifically, this maximum value may be set relatively large when an onboard electrical load that generates a high level of noise when operating is operating, and set relatively small when an onboard electrical load that generates a low level of noise when operating is operating.

When an onboard electrical load that generates a high level of noise when operating is operating, the amount of noise that is generated is large, so it is more likely that wireless communication between the checking device 18 and the mobile device 16 will be impeded. On the other hand, when an onboard electrical load that generates a low level of noise when operating is operating, the amount of noise that is generated is small, so it is less likely that wireless communication between the checking device 18 and the mobile device 16 will be impeded. Therefore, it is possible to have an opportunity when the ID code in the vehicle internal check will match, without the check being affected by noise, by increasing the number of times that the check described above is repeatedly performed (i.e., the number of rechecks) when an onboard electrical load that generates a high level of noise when operating is operating, compared to when an onboard electrical load that generates a low level of noise when operating is operating. Also, it is possible to issue an alarm quickly when the mobile device 16 is not in the vehicle, by reducing the number of times the vehicle interior check is repeatedly performed (i.e., the number or rechecks) when an onboard electrical load that generates a low level of noise when operating is operating, compared to when an onboard electrical load that generates a high level of noise when operating is operating.

Therefore, according to the communication system 10 of this invention, even in a situation in which noise is generated by operation of an onboard electrical load such as an engine or a wiper, it is possible to inhibit, to the greatest extent possible, an alarm indicating that the mobile device 16 has been taken out of the vehicle cabin from being erroneously issued, while reducing a delay in the timing at which the alarm is issued due to a discrepancy in the check, by changing the maximum value of the number of rechecks, i.e., the number of times that the check for the mobile device 16 described above is allowed to be repeated, according to the operating state of an onboard electrical load.

In particular, when the wiper is operated continuously, operating noise is constantly generated by the wiper motor 24 that drives this wiper. On the other hand, when the wiper is operated intermittently, the operating noise generated by the wiper motor 24 that drives the wiper is generated intermittently (i.e., at intervals), so during this intermittent pause, operating noise is not generated by the wiper motor 24. If the vehicle interior check is performed during this intermittent pause during which operating noise is not generated, wireless communication in the vehicle cabin between the checking device 18 and the mobile device 16 is possible, or more specifically, a request signal in the LF band sent from the indoor antenna 30 of the checking device 18, or a response signal in the LF band sent from the mobile device 16 in the vehicle, is able to be properly received by the mobile device 16 or the indoor tuner 34 without being impeded by the operating noise from the wiper motor 24.

Therefore, according to this example embodiment, when noise is generated by intermittent operation of the wiper, an alarm indicating that the mobile device 16 has been taken out of the vehicle cabin is able to be inhibited from being erroneously issued, with almost no delay in the timing at which the alarm is issued based on a vehicle interior check discrepancy, by setting the number of times that the vehicle interior check is repeatedly performed (i.e., the number of rechecks) to the minimum value (such as 1).

In the example embodiment described above, the checking device 18 functions as the checking means described in the claims. Also, determination by the body ECU 28 of the body control device 14 whether the wiper motor 24 or the vehicle engine is operating in step 110 in the routine shown in FIG. 2 functions as the detecting means described in the claims. Further, setting the number of setting times X to the predetermined number of times n according to the operating state of the wiper motor 24 or the vehicle engine in step 120 by the body ECU 28 functions as the changing means described in the claims. Issuing an alarm by body ECU 28 in step 180 functions as the alarm issuing means described in the claims.

In the example embodiment described above, the engine and the wiper are given as examples of the onboard electrical load, but the invention is not limited to this. That is, the onboard electrical load may be anything that generates noise that affects wireless communication between the checking device 18 and the mobile device 16 when operating.

Also, in the example embodiment described above, the body ECU 28 determines whether an onboard electrical load is actually operating, based on information supplied from the device via the onboard LAN 40, and detects the operating state of the onboard electrical load, but the invention is not limited to this. That is, it is also possible to directly detect noise that impedes wireless communication between the checking device 18 and the mobile device 16, and detect the operating state of the onboard electrical load based on this noise level.

Furthermore, in the example embodiment described above, when the ID code matches once with one round of wireless communication between (i.e., once to and once from) the checking device 18 and the mobile device 16, it may be determined that the mobile device 16 is in the vehicle cabin, and one round of wireless communication may be performed between the checking device 18 and the mobile device 16 when performing the vehicle interior check once. However, when the ID code matches a plurality of times with two or more rounds of wireless communication between the checking device 18 and the mobile device 16, it may be determined that the mobile device 16 is in the vehicle cabin, and two or more rounds of wireless communication may be performed between the checking device 18 and the mobile device 16 when performing the vehicle interior check once.

Also, in this example embodiment, the communication system 10 is configured as shown in FIG. 1, but the invention is not limited to this. That is, the communication system 10 may also be configured such that the functions of the sensors and the ECUs are executed with one or only some of the ECUs, or be configured such that these functions are divided up and handled by a plurality of devices.

The invention claimed is:

1. A communication system comprising:
an electronic control unit including program logic configured to:
perform a check to detect whether a mobile device carried by a user of a vehicle is in the vehicle via wireless communication between an onboard device and the mobile device when a door of the vehicle has changed from being open to being closed;
detect an operating state of an onboard electrical load when the check is performed; and
based upon the mobile device not being detected in the vehicle while the vehicle is in an operational state, change a maximum value of a number of rechecks, which is the number of times the check is allowed to be repeatedly performed, according to the operating state of the onboard electrical load.

2. The communication system according to claim 1, wherein the electronic control unit sets the maximum value of the number of rechecks larger when an onboard electrical load that generates a large amount of electromagnetic noise is operating, as compared to when an onboard electrical machine that generates a small amount of electromagnetic noise is operating.

3. The communication system according to claim 1, wherein the electronic control unit sets the maximum value of the number of rechecks larger when an engine is operating, compared to when a wiper is operating.

4. The communication system according to claim 1, wherein the electronic control unit sets the maximum value of the number of rechecks larger when a wiper is operating continuously, compared to when the wiper is operating intermittently.

5. The communication system according to claim 1, wherein the electronic control unit is further configured to
issue an alarm to the user of the vehicle based upon the mobile device not being detected in the vehicle and the check having been performed the maximum value.

6. A communication method comprising:
performing a check to detect whether a mobile device carried by a user of a vehicle is in the vehicle via wireless communication between an onboard device and the mobile device when a door of the vehicle has changed from being open to being closed;
detecting an operating state of an onboard electrical load when the check is performed; and
based upon the mobile device not being detected in the vehicle while the vehicle is in an operational state, changing a maximum value of a number of rechecks, which is the number of times the check is allowed to be repeatedly performed, according to the operating state of the onboard electrical load.

7. A controller comprising:
a checking portion that performs a check to detect whether a mobile device carried by a user of a vehicle is in the vehicle via wireless communication between an onboard device and the mobile device when a door of the vehicle has changed from being open to being closed;
a detecting portion that detects an operating state of an onboard electrical load when the check is performed by the checking portion; and
a changing portion that changes a maximum value of a number of rechecks, which is the number of times the check is allowed to be repeatedly performed by the checking portion, according to the operating state of the onboard electrical load detected by the detecting portion, when the mobile device has not been detected in the vehicle by the check performed by the checking portion.

* * * * *